March 23, 1926. 1,577,441
P. BAKKEN
STABILIZER FOR MOTOR VEHICLES
Filed March 10, 1924

INVENTOR:
Peder Bakken.
BY A. M. Carlsen
ATTORNEY.

Patented Mar. 23, 1926.

1,577,441

UNITED STATES PATENT OFFICE.

PEDER BAKKEN, OF ST. PAUL, MINNESOTA.

STABILIZER FOR MOTOR VEHICLES.

Application filed March 10, 1924. Serial No. 698,003.

*To all whom it may concern:*

Be it known that I, PEDER BAKKEN, a citizen of the United States, residing at St. Paul, in the county of Ramsey and State of Minnesota, have invented certain new and useful Improvements in Stabilizers for Motor Vehicles, of which the following is a specification.

My invention relates to stabilizers for spring mounted vehicle bodies. The object is to provide a simple and efficient device particularly adaptable for automobiles and the use of which largely reduces vibration or shocks to an automobile body caused by bumps or uneven road surfaces on which an auto travels. The device acts not only as a shock absorber, snubber and rebound eliminator but also neutralizes side strains on the vehicle body and springs thereby improving the riding qualities of a car.

Figure 1:
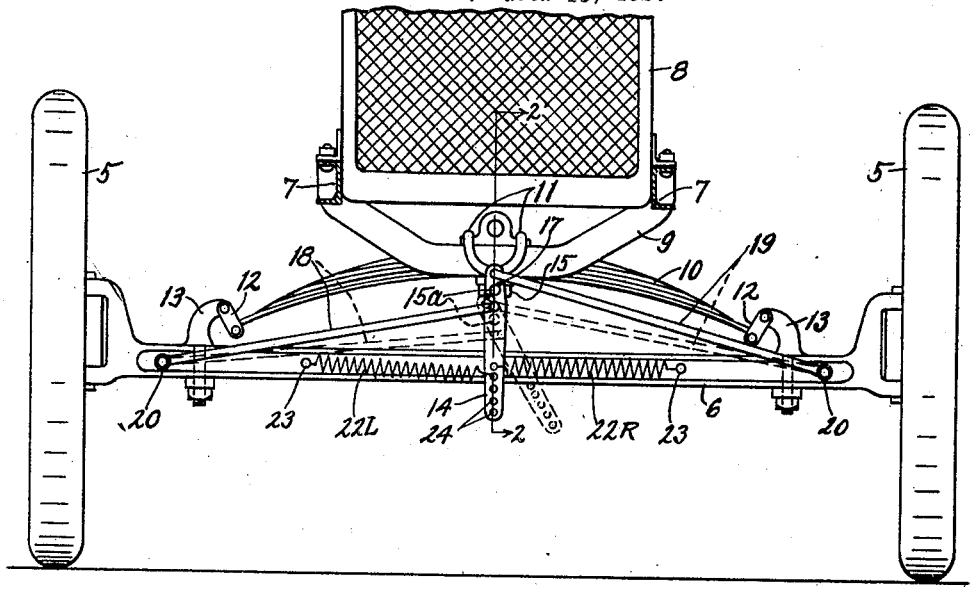
Fig. 1 is a rear elevation of the front axle, radiator and adjacent parts of an automobile with one of my devices in operative position thereon.

Referring to the drawing by reference numerals, I have illustrated my device mounted on the front part of an automobile of which 5 are the front wheels, 6 the front axle, 7 the longitudinal frame channels, 8 the radiator and 9 the front cross member of the frame usually arched downwardly about as shown. The latter member, 9, straddles the front body spring 10 to which it is clamped by a yoke 11. The spring illustrated is of the so-called half elliptic type the ends of which are pivotally secured in links 12 which are each pivotally suspended in an arched axle bracket 13.

My device comprises a vertically arranged lever 14 preferably pivoted to a fixed element at or near that part of the auto chassis to which the spring is fixed and is movable in a plane parallel and close to the body spring. Said fixed element may be a bar 15 with apertures through which the threaded parts 11ª of the spring clip or yoke 11 are inserted and clamped against the under side of the spring by nuts 16. Said bar 15 has a rounded extension 15ª on which the lever 14 is fulcrumed and held in place by means such as a cotter pin 17. Above and below said fulcrum I provide two holes in the bar 15 preferably about one inch from the center of pin 15ª and in each of these holes is inserted one end of a radius rod, one of which as 18 extends to the right, and the other as 19 extends to the left and the outer end of each pivotally secured as at 20 either directly to the axle (as in Figs. 1 and 2) or to a bracket 21 (Fig. 3) secured each on the axle at a point near its outer end. As shown in Fig. 1 the fulcrum 15ª of lever 14 is above the axle and the radius rods 18—19 therefore incline to their fixed outer ends and are each necessarily longer than the horizontal distance from its fixed point 20 to the vertical center line of bar 14. Therefore, when the axle 6 is for any reason jerked upwardly or the body of the car comes closer than normally to the axle the fulcrum 15ª is moved correspondingly as to the dotted position in Fig. 1. This will cause the radius rods to move downwardly and simultaneously tilt the lever 14 to an angular position. Said lever is immediately sprung toward its vertical position by the contracting action of a tension coil spring 22$^L$ arranged horizontally with one end fixed as at 23 on the axle and its inner end in one of a row of holes 24 in the lower end of the lever 14. Another coil spring 22$^R$ with one end fixed in one of the holes 24 and its other end as at 23 on the axle serves to check the rebound of arm 14. The radius rods 18—19 are made of strong bar material and being both at all times in corresponding radial relation to fulcrum 15ª it will be readily seen that only a vertical movement of the car body is possible and the objectionable side strain common to some cars is eliminated.

Figure 2:
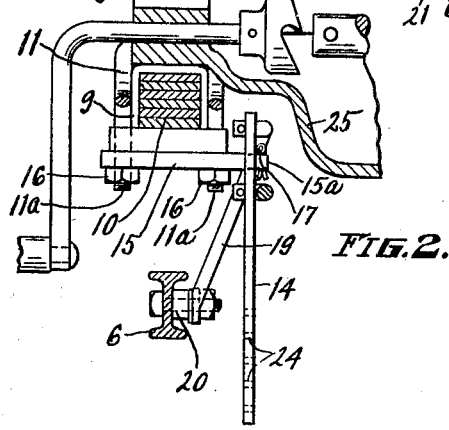
Fig. 2 is an enlarged section on line 2—2 in Fig. 1.
Figure 3:
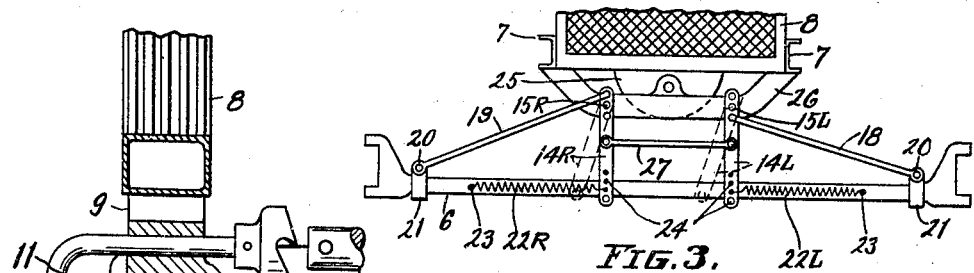
Fig. 3 is a front view of my device in modified form as applied on the front side of an auto axle and some of the adjacent parts of the auto involved in the mounting of my device.

The construction and mounting of my device as shown in Figs. 1 and 2 is for automobiles so constructed that the engine housing 25 or any other part of it does not interfere with the movement of lever 14 at the inner side of the axle. In the modification, Fig. 3, is shown how my device is installed where the engine housing 25 or other part of an auto will not permit the device being installed on the inner side of the axle. In such cases I simply provide two horizontally spaced levers 14$^R$ and 14$^L$ fulcrumed at 15$^R$ and 15$^L$ respectively on any convenient fixed part 26 of the car and sufficiently far apart to insure no obstruction to the swinging movement of the bars which are connected by a horizontal link 27. Spring 22$^R$ is of course attached to arm 14$^R$ and the right hand end of the axle 6 and spring 22$^L$ is attached with one end to bar 14$^L$ and its other end at the left end of the axle. Likewise, radius rod 18 is pivotally connected to lever 14$^L$ below fulcrum 15$^L$ and rod 19 is pivotally connected to lever 14$^R$ above its fulcrum 15$^R$. The action of this modified device is of course the same as in the device shown in Figs. 1 and 2 except that two spaced, link connected levers 14 are used instead of one.

The operation of my device has been quite fully disclosed in the foregoing description. It is apparent that the counteracting tension springs 22 at all times tend to hold the lever or levers 14 in vertical position at which time the car body is in normal spaced relation to the running gear. The radius rods 18—19 will always keep the fulcrum 15$^a$ central and insure only a vertical movement of the car body. Side strains hitherto particularly affecting the spring links 12, and causing considerable wear and tear, and lateral movement of the car body is entirely avoided, limiting the usefulness of said links for what they were intended for, namely to allow for horizontal expansion of the body spring. Side strains often cause wobbling of the steering wheels with resultant jarring and twisting of steering gear parts. Violent vertical vibration is eliminated by the action of springs 22 as above described.

What I claim is:

1. In a vehicle stabilizer of the class described the combination with a vehicle body supported in spaced relation to its running gear by springs, of a lever mounted pivotally and in fixed relation to a spring and oscillable in a plane parallel with the movement of the body spring, two radius rods extending in opposite directions from said lever and pivotally connected to said lever one at each side of fulcrum and their outer ends pivotally secured each to a fixed part of the running gear and means causing the said lever to be continuously impelled to a position coinciding with the direction in which the body springs are movable.

2. The structure specified in claim 1 in which said lever impelling means comprises two tension springs, one at each side of the lever, each connected with its inner end to the lever and its outer end to the running gear.

3. The structure specified in claim 1 in which said radius rods are inclined from their ends pivoted in the lever to their pivotally fixed outer extremities for the purpose set forth.

4. The combination of a vehicle having two parts, a body part and a running gear part connected by vertically yieldable body springs in movable relation to each other, of a stabilizer comprising a spring controlled oscillable element pivotally secured on one of said vehicle parts and adjacent a body spring, radius rods pivotally connected to said oscillable element at opposite sides of its fulcrum and the other end of each rod pivotally secured to the other part of the vehicle.

In testimony whereof I affix my signature.

PEDER BAKKEN.